United States Patent
Kim et al.

(10) Patent No.: US 7,791,672 B2
(45) Date of Patent: Sep. 7, 2010

(54) SCANNING CONVERSION APPARATUS AND METHOD

(75) Inventors: Tae-Sun Kim, Yong-In (KR); Jong-Won Lee, Seoul (KR); Jae-Hong Park, SeongNam (KR); Jae-Ho Kim, HwaSung (KR)

(73) Assignee: Samsung Electronics Co., Ltd., Gyeognggi-do (KR)

( * ) Notice: Subject to any disclaimer, the term of this patent is extended or adjusted under 35 U.S.C. 154(b) by 872 days.

(21) Appl. No.: 10/811,993

(22) Filed: Mar. 30, 2004

(65) Prior Publication Data

US 2004/0252233 A1 Dec. 16, 2004

(30) Foreign Application Priority Data

Jun. 10, 2003 (KR) .......................... 2003-0037137

(51) Int. Cl.
*H04N 11/20* (2006.01)
(52) U.S. Cl. ........................... 348/448; 348/452
(58) Field of Classification Search ............. 348/448, 348/441, 452, 447, 450, 451
See application file for complete search history.

(56) References Cited

U.S. PATENT DOCUMENTS

| | | | |
|---|---|---|---|
| 5,019,903 A * | 5/1991 | Dougall et al. ............. 348/448 |
| 5,497,199 A | 3/1996 | Asada et al. | |
| 5,619,272 A | 4/1997 | Salmon et al. | |
| 5,661,525 A * | 8/1997 | Kovacevic et al. ......... 348/452 |
| 5,936,676 A * | 8/1999 | Ledinh et al. ............. 348/452 |
| 5,943,099 A | 8/1999 | Kim | |
| 6,014,182 A | 1/2000 | Swartz | |
| 6,239,842 B1 | 5/2001 | Segman | |
| 6,452,639 B1 * | 9/2002 | Wagner et al. ............. 348/448 |
| 6,459,455 B1 | 10/2002 | Jiang et al. | |
| 6,577,349 B1 | 6/2003 | Yamaguchi et al. | |
| 6,614,485 B2 * | 9/2003 | Shin et al. ............... 348/452 |
| 6,661,464 B1 | 12/2003 | Kokkosoulis et al. | |
| 7,042,512 B2 * | 5/2006 | Yang et al. ............... 348/452 |
| 2002/0101535 A1 | 8/2002 | Swan | |
| 2007/0229917 A1 * | 10/2007 | Itani ..................... 358/479 |

FOREIGN PATENT DOCUMENTS

| | | |
|---|---|---|
| CN | 1173776 | 2/1998 |
| JP | 2574370 | 9/1989 |
| JP | 2984020 | 12/1990 |
| JP | 09-224223 | 8/1997 |
| JP | 11-266439 | 9/1999 |

(Continued)

OTHER PUBLICATIONS

Office Action dated Dec. 8, 2006 for corresponding Chinese Application No. 200410064079.0.

(Continued)

*Primary Examiner*—Trang U Tran
(74) *Attorney, Agent, or Firm*—Harness, Dickey & Pierce, P.L.C.

(57) ABSTRACT

In the scanning conversion apparatus, interlaced-to-progressive scanning is performed according to one of at least two different techniques. The technique used depends on the interlaced scan data being converted. As examples, a spatial interpolation technique, a spatial/temporal interpolation technique, or other technique may be selected.

24 Claims, 11 Drawing Sheets

FOREIGN PATENT DOCUMENTS

| | | |
|---|---|---|
| JP | 3293561 | 2/2000 |
| JP | 2001-169252 | 6/2001 |
| JP | 2001-189919 | 7/2001 |
| JP | 2002-510946 | 4/2002 |
| JP | 2002-290926 | 10/2002 |

OTHER PUBLICATIONS

Gerard De Haan and Erwin B. Bellers, "Deinterlacing—An Overview", Proceedings of the IEEE, vol. 86, No. 9, Sep. 1998.

Foreign Search Report dated Nov. 18, 2004.

Korean Office Action dated Jun. 20, 2005.

German Office Action (dated Jun. 23, 2008) for counterpart German Application No. 10 2004 029 041.5-31 is provided by the purposes of certification under 37 C.F.R. § 1.97(e).

Japanese Office Action dated May 18, 2010.

\* cited by examiner

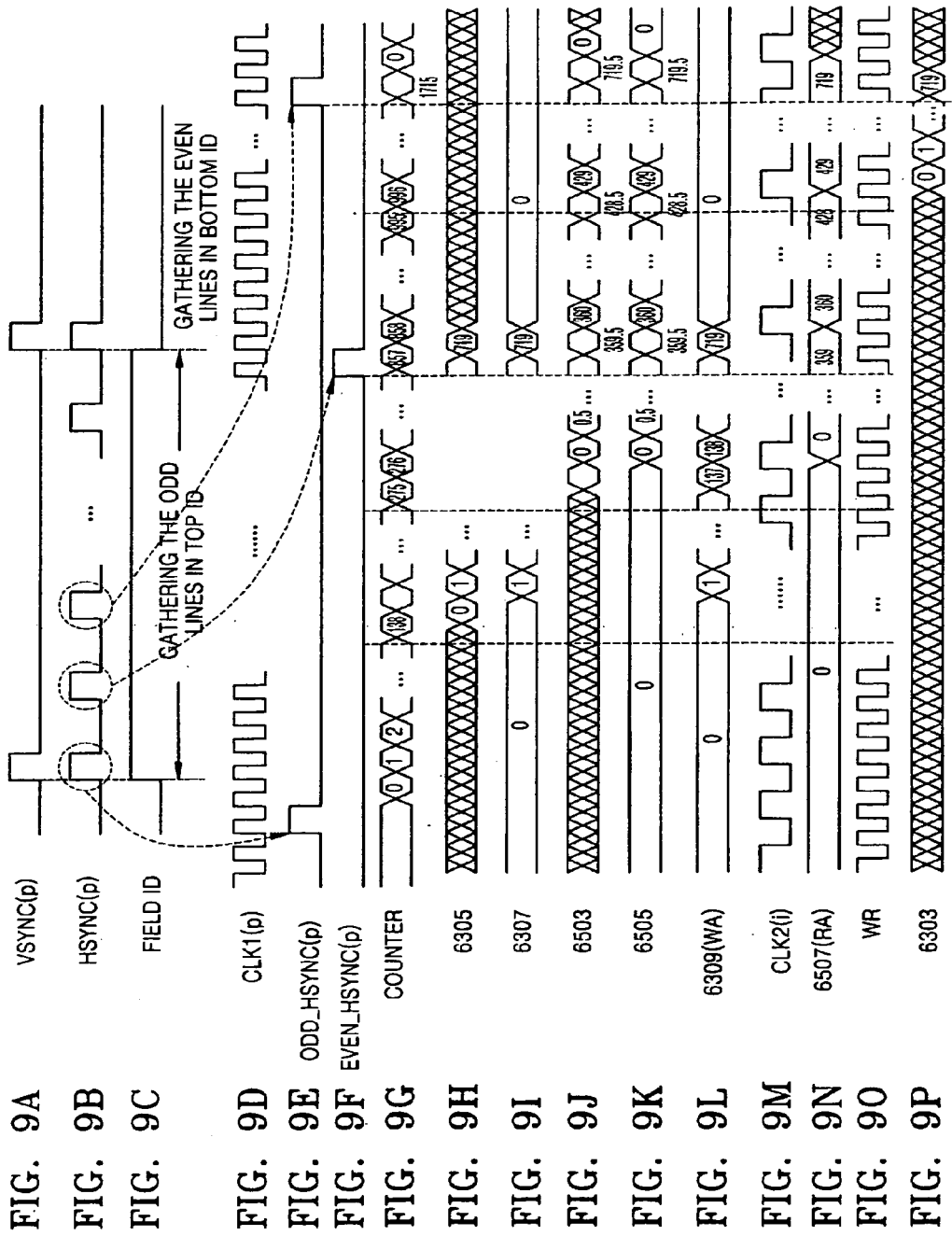

SCANNING CONVERSION APPARATUS AND METHOD

BACKGROUND OF THE INVENTION

Various types of display apparatuses (e.g., televisions, computer monitors, etc.) typically use one of two types of display methods—interlaced scan and progressive scan. In both methods, images are divided into several scanning lines. In the interlaced scan method, the odd numbered scanning lines and the even numbered scanning lines are alternatively displayed. The odd numbered scanning lines of the image are referred to as the odd field or top field. The even numbered scanning lines of the image are referred to as the even field or the bottom field. The top and bottom fields are alternatively displayed at a high speed such that a person sees a single composite screen. In the progressive scan method, the image is displayed line by line; namely, all the scanning lines are displayed.

Interlaced scan data may be field based or frame based. The following is an example of frame based interlaced scan data, where "T" represents a top field, "B" represents a bottom field and "t" represents time:

$$T_t, B_t, T_{t+1}, B_{t+1}, T_{t+2}, B_{t+2}, \ldots$$

As shown above, the frame based interlaced scan data includes a top field and a bottom field of an image derived at the same point in time. If the top and bottom fields from the same point in time were combined, then a frame of progressive scan data would be produced. Next, the following is an example of field based interlaced scan data:

$$T_t, B_{t+1}, T_{t+2}, B_{t+3}, \ldots$$

In contrast to frame based interlaced scan data, field based interlaced scan data does not include top and bottom fields from the same point in time. Combining top and bottom fields of field based interlaced scan data to create a frame of progressive scan data may result in a poor image, particularly when a large amount of motion in the images is present.

Different video generation devices (e.g., computers, DVD players, video tape players, etc.) typically generate video data according to one of the interlaced scan or progressive scan method. As such, the video generation device may not produce video data according to a method compatible with the scan method expected by a desired display device.

SUMMARY OF THE INVENTION

The present invention provides a scanning conversion apparatus and method that allows conversion of progressive scan data into interlaced scan data, conversion of interlaced scan data into progressive data, or both.

For example, in one embodiment, a first converter converts input interlaced scan data into progressive scan data, and a second converter converts the progressive scan data output from the first converter to interlaced scan data. In one exemplary embodiment, the interlaced-to-progressive converter and the progressive-to-interlaced converter are connected in series to generate interlaced scan data synchronized with progressive scan data output by the interlaced-to-progressive converter.

In an exemplary embodiment of converting interlaced scan data into progressive scan data, one of a number of different conversion techniques is selected to perform the conversion. The selection is based on the interlaced scan data being converted.

For example, in one embodiment, the conversion techniques include a spatial interpolation technique, a weave technique and a spatial/temporal interpolation technique. The spatial interpolation technique involves performing spatial interpolation on a current field of the input interlaced scan data to produce a field of complementary scan data that together with the current field represents a frame of progressive scan data. The weave technique involves alternately outputting two consecutive fields of the interlaced scan data on a scan line by scan line basis to produce a frame of progressive scan data. The spatial/temporal interpolation technique involves performing directionally adaptive spatial interpolation using the current field, at least one previous field and at least one subsequent field of the input interlaced scan data to produce a field of complementary scan data that together with the current field represents a frame of progressive scan data.

The spatial interpolation technique is selected when a current field of the input interlaced scan data is one of preceded and followed by a field of a same type. The weave technique is selected when the input interlaced scan data is frame based interlaced scan data. The spatial/temporal interpolation conversion technique is selected when the input interlaced scan data is field based interlaced scan data.

In an exemplary embodiment of the interlaced-to-progressive converter, a conversion structure is configured to generate different streams of scan data from input interlaced scan data, the different streams of scan data representing conversion of the input interlaced scan data into progressive scan data according to one of the above described techniques. A selector is configured to selectively output the different streams of scan data as progressive scan data.

For example, the conversion structure includes an interpolator configured to interpolate lines of a frame of progressive scan data missing from a current field of the input interlaced scan data by spatially interpolating the missing lines using the current field. As a further example, the conversion structure is configured to supply the selector with the input interlaced scan data of a current field and one of a preceding and following field of the input interlaced scan data. As a still further example, the conversion structure includes a spatial/temporal interpolator configured to perform a spatial/temporal interpolation conversion technique on the input interlaced scan data to produce a portion of the progressive scan data.

In this example, the selector is configured to select output from the interpolator as a portion of the progressive scan data when the current field of the input interlaced scan data is one of preceded and followed by a field of a same type. The selector is also configured to select data from the current field of the input interlaced scan data and data from one of a previous or next field of the input interlaced scan data as the progressive scan data when the input interlaced scan data is frame based interlaced scan data. The selector is further configured to select output from the spatial/temporal interpolator as a portion of the progressive scan data when the input interlaced scan data is field based interlaced scan data.

In another exemplary embodiment, the converter structure includes a spatial interpolator and a temporal interpolator. The spatial interpolator is configured to perform spatial interpolation of a current field of interlaced scan data along a single direction to produce a first complementary field in a first mode indicated by a control command, and is configured to perform directionally adaptive spatial interpolation of the current field to produce a second complementary field in a second mode indicated by the control command. The temporal interpolator is configured to perform temporal interpolation using the current field of interlaced scan data, at least one previous field of interlaced scan data and at least one subsequent field of interlaced scan data to produce a third complementary field in at least the second mode indicated by the control command. The converter structure further includes a conversion mode output device receiving output of the spatial interpolator and the temporal interpolator and generating a frame of progressive scan data based on the control command.

For example, the conversion mode output device is configured to output the current field and the first complementary field on a scan line by scan line basis to produce a frame of progressive scan data in the first mode indicated by the control command; and is configured to combine the second complementary field and the third complementary field into a composite complementary field and to output the current field and the composite complementary field on a scan line by scan line bases to produce a frame of progressive scan data in the second mode indicated by the control command. In yet a third mode, the spatial interpolator is configured to output the current, the temporal interpolator is configured to output one of the previous field and next field, and the conversion mode output device is configured to alternatively output the output from the spatial and temporal interpolators on a line by line basis.

In an exemplary embodiment of the progressive-to-interlaced converter, a counter generates count values at a progressive scanning frequency such that the count values are associated with a period of the progressive scan data. A write address generator generates write addresses for writing progressive scan data into a memory based on output of the counter, and a read address generator generates read addresses for outputting the progressive scan data written into the memory as interlaced scan data. In one exemplary embodiment, an address controller selectively applying the write and read addresses to the memory from the write and read address generators.

In one exemplary embodiment, the counter generates count values associated with different periods of the progressive scan data based on whether the progressive scan data is being converted into one of an odd and an even field of interlaced scan data.

In another exemplary embodiment, the write address generator includes a first write address generator generating first write addresses associated with a first of two consecutive scan lines of progressive data based on the count values and a second write address generator generating second write addresses associated with a second of the two consecutive scan lines of progressive scan data based on the count values. Here, a write address controller selectively outputs one of the first and second write addresses based on whether the progressive scan data is being converted into one of an odd and even scan line of interlaced scan data.

In a still further example of a progressive-to-interlaced scan data converter, the converter includes a timer indicating a timing of two consecutive scan line of progressive scan data. Here, a write address generator receives a control signal indicating which of the two consecutive scanning lines to write into a memory, and the write address generator generates write address for the indicated scanning line based on the timing indicated by the timer. Also, a read address generator generates read addresses to read the written line from the memory, and the read address generator begins the generation of the read addresses based on the timing indicated by the timer.

BRIEF DESCRIPTION OF THE DRAWINGS

The present invention will become more fully understood from the detailed description given below and the accompanying drawings, wherein like elements are represented by like reference numerals, which are given by way of illustration only and thus are not a limit on the present invention and wherein:

FIG. 9 illustrates waveforms input by and output by elements of the PIC in FIG. 8.

DETAILED DESCRIPTION OF EMBODIMENTS

Scanning Conversion Apparatus

Figure 1:
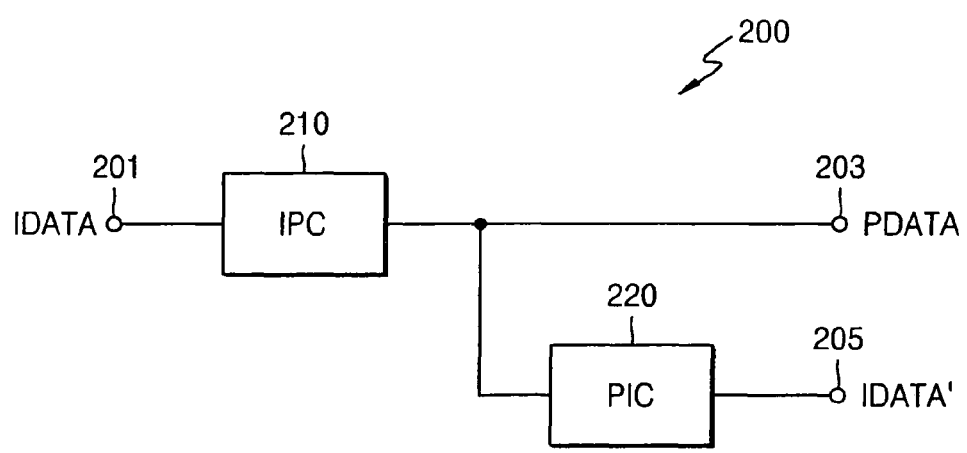
FIG. 1 illustrates a scanning conversion apparatus according to one example embodiment of the present invention.

FIG. 1 illustrates a scanning conversion apparatus according to one example embodiment of the present invention. As shown, an interlaced-to-progressive converter (IPC) 210 receives interlaced scan data IDATA such as generated by a video generating device (e.g., a video tape player, DVD player, etc.), and converts the interlaced scan data IDATA to progressive scan data PDATA. The generated progressive scan data PDATA may form one output of the scanning conversion apparatus. A progressive-to-interlaced converter (PIC) 220 receives the generated progressive scan data PDATA, and converts the generated progressive scan data PDATA to interlaced scan data IDATA'. The generated interlaced scan data IDATA' may form an output of the scanning conversion apparatus. As will be discussed in detail below, because the generated interlaced scan data IDATA' is generated from the generated progressive scan data PDATA, a better synchronization exists between the generated progressive scan data PDATA and the generated interlaced scan data IDATA' than exists between the original interlaced scan data IDATA and the generated progressive scan data PDATA.

Figure 2:
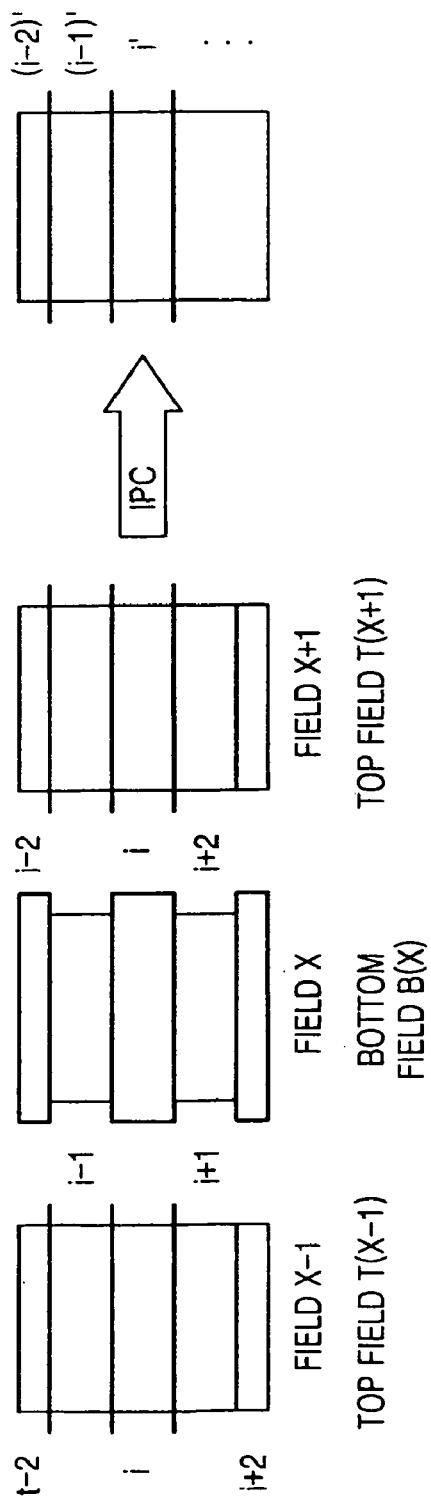
FIG. 2 illustrates a relationship between the original interlaced scan data IDATA and the generated progressive scan data PDATA in FIG. 1.

FIG. 2 illustrates a relationship between the original interlaced scan data IDATA and the generated progressive scan data PDATA that will be used below in the detailed descriptions of the example embodiments of the IPC 210. FIG. 2 shows a current field X of the interlaced scan data IDATA that includes scan lines (i−1), (i+1), etc. with respect to a reference scan line (i), a previous field X−1 that includes scan lines (i−2), (i), and (i+2), and next field X+1 that includes scan lines (i−2), (i), and (i+2). As further shown, after conversion by the IPC 210, a frame of progressive scan data having scanning lines (i−2)', (i−1)', (i)', etc is created. The relationship between the scanning lines of the interlaced scan fields and the progressive scan frames will be described in greater detail below in explaining the operation of the IPC 210.

IPC of the Scanning Conversion Apparatus

Figure 3:
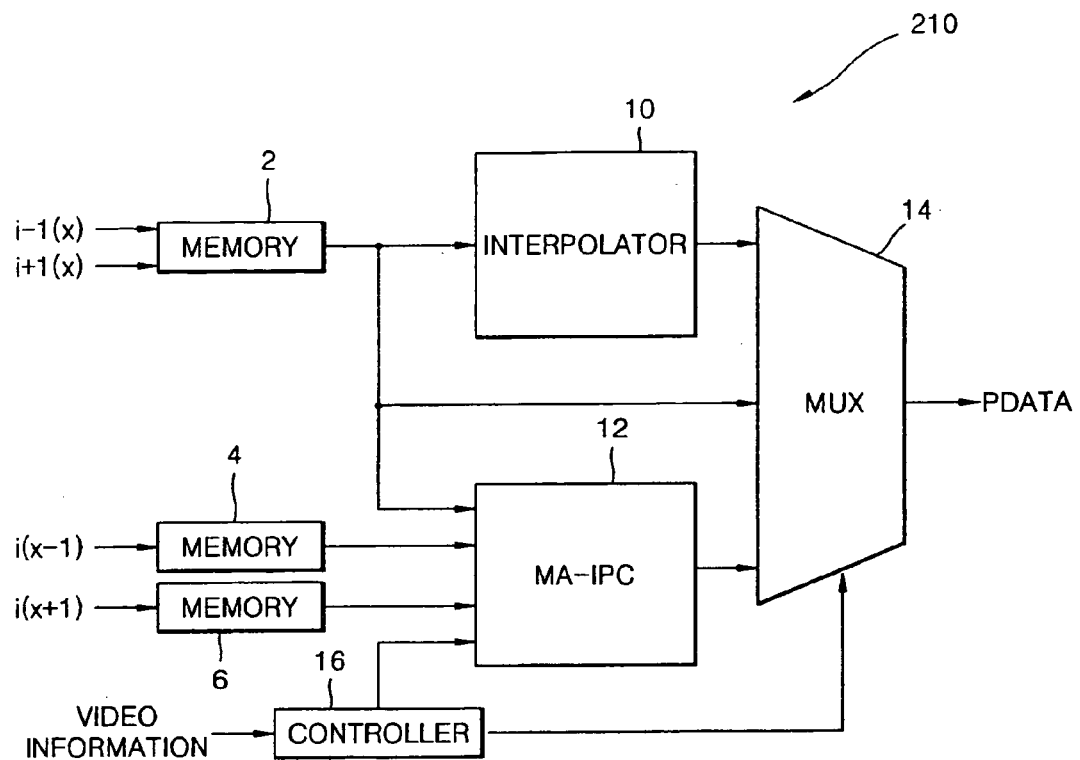
FIG. 3 illustrates an example embodiment of the interlaced-to-progressive converter (IPC) in FIG. 1.

FIG. 3 illustrates an example embodiment of the interlaced-to-progressive converter (IPC) in FIG. 1. As shown, the IPC 210 includes first, second and third memories 2, 4 and 6. The first memory 2 stores at least successive lines of a current field of the interlaced scan data IDATA. For example, using the relationship established in FIG. 2, the first memory 2 stores at least the (i−1)th and (i+1)th scan lines, respectively, from field X. The second and third memories 4 and 6 store at least a scan line, lying between the consecutive scan lines stored in first memory 2, for the previous field and next field, respectively. For example, using the relationship established in FIG. 2, the second and third memories 4 and 6 store at least the ith scan line from field X−1 and ith scan line from field X+1, respectively. The number of scan lines stored by the first, second and third memories 2, 4 and 6 will become more apparent from the detailed discussion below.

Figure 4A:
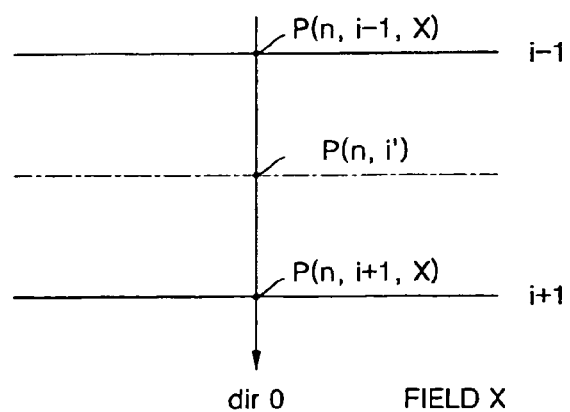
FIG. 4A illustrates an example of spatial interpolation.

An interpolator 10 uses two consecutive scan lines stored in the first memory 2 to generate an interpolated scan line. The interpolation performed by the interpolator 10, in one embodiment, is spatial interpolation. Using the relationship established in FIG. 2, a simple spatial interpolation will be described with reference to FIG. 4A. FIG. 4A illustrates a pixel P(n, i−1, X), where n represents the position in the scanning line, i−1 is the scanning line on which the pixel lies and X is the field including the pixel. FIG. 4A further illustrates a corresponding pixel P(n, i+1, X) along a direction dir0 in the next scanning line i+1 of field X. As shown the direction dir0 is perpendicular to the scanning lines. A pixel P(n, i') that would lie on the scanning line (i)' in the direction dir0 if the scan data where progressive scan data is interpolated by averaging the pixels P(n, i−1, X) and P(n, i+2, X). For example, P(n, i')=(P(n, i−1, X)+P(n, i+1, X))/2.

Motion Adaptive Converter

A motion adaptive converter 12 also receives the scanning lines stored by the first memory 2, and further receives the scanning lines stored by the second and third memories 4 and 6. The motion adaptive converter 12 analyzes the amount of motion present in the images represented by the interlaced scan data, and generates pixel data for a progressive scan line based on this analysis. This process will now be described in detail below.

Figure 4B:
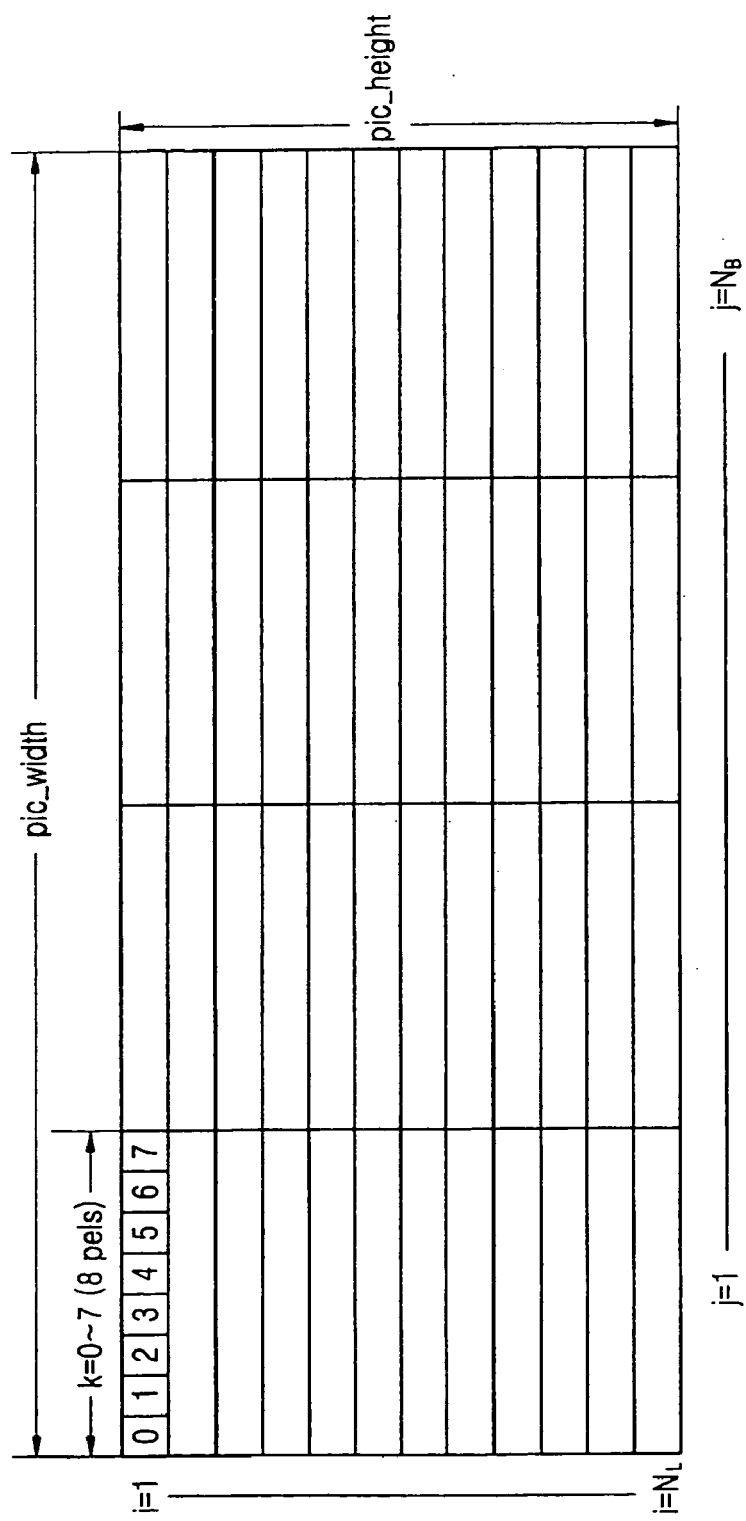
FIG. 4B illustrates an example of a block (i,j) of pixels.

In the following discussion of the motion adaptive converter 12, $x_k^n(i,j)$ means the $k_{th}$ pixel value in a block (i,j) of the $n_{th}$ field. And, $x^n(i,j)$ means the (i,j) pixel value of the $n_{th}$ field. FIG. 4B illustrates an example of a block (i,j).

The motion adaptive converter 12 calculates the SAD (sum of absolute difference) for "motion detection" between a previous field $x_k^{n-1}(i,j)$ and next field $x_k^{n+1}(i,j)$ in block-wise manner as shown in FIG. 4B and equations (1) and (2) below.

$$\text{sad}(i, j) = \frac{1}{8} \cdot \sum_{k=0}^{7} |x_k^{n+1}(i, j) - x_k^{n-1}(i, j)| \tag{1}$$

-continued $$\text{SAD}(i, j) = \frac{1}{4} \cdot \sum_{m=i-2}^{i+1} \text{sad}(m, j) \tag{2}$$

where $N_L$=pic_height, and $$N_B = \frac{\text{pic\_width}}{8}.$$

The motion adaptive converter 12 determines a motion detection threshold from the following criterion in equation (3).

$$TH_M(i,j)=(STD_m(i,j)<T_{M1})?T_{M1}:(STD_m(i,j)>T_{M2})?T_{M2}:STD_m(i,j) \tag{3}$$

where $T_{M1}$ and $T_{M2}$ are design constraints set by the designer through empirical study (e.g., $T_{M1}$ may be set to 8 and $T_{M2}$ may be set to 16), and where $STD_m(i,j)$ is a so-called "modified for simplification" standard deviation of the 4×8 pixels surrounding the pixel of interest within 2 upper blocks and 2 lower blocks of the current field X according to FIG. 4B and equation (4) below.

$$STD_m(i, j) = \frac{1}{32} \cdot \sum_{m=i\pm1,i\pm3} \sum_{p=0}^{7} \left| \left( \frac{1}{32} \cdot \sum_{l=i\pm1,i\pm3} \sum_{k=0}^{7} x_k^n(l, j) \right) - x_p^n(m, j) \right| \tag{4}$$

If SAD(i,j)≧$TH_M$(i,j) then the pixel of interest has global motion and a "motion judder" value $m_j$(i,j)=1; if not $m_j$(i,j)=0.

Next, the motion adaptive converter 12 derives spatio-temporal interpolation variables as defined by equations (5)-(14) below.

$$S_{-1}(i,j)=x^n(i-1,j-1)+2\cdot x^n(i-1,j)+x^n(i-1,j+1) \tag{5}$$

$$S_{+1}(i,j)=x^n(i+1,j-1)+2\cdot x^n(i+1,j)+x^n(i+1,j+1) \tag{6}$$

$$S(i,j)=|S_{-1}(i,j)-S_{+1}(i,j)| \tag{7}$$

$$\alpha_l(i, j) = \begin{cases} 0 & S(i, j) > T_{l2} \\ 1 & S(i, j) < T_{l1} \\ \frac{T_{l2} - S(i, j)}{T_{l2} - T_{l1}} & \text{otherwise} \end{cases} \tag{8}$$

$$m_a(i,j)=|x^{n+1}(i,j)-x^{n-1}(i,j)| \tag{9}$$

$$m_b(i, j) = \left| x^{n-1}(i, j) - \frac{x^n(i+1, j) + x^n(i-1, j)}{2} \right| \tag{10}$$

$$m_c(i, j) = \left| x^{n+1}(i, j) - \frac{x^n(i+1, j) + x^n(i-1, j)}{2} \right| \tag{11}$$

$$M_1(i,j)=\max(m_a(i,j),\alpha_1\cdot\max(m_b(i,j),m_c(i,j))) \tag{12}$$

$$M_S(i,j)=\max(M_1(i,j),M_1(i-2,j),M_1(i+2,j),M_1(i,j-1),M_1(i,j+1)) \tag{13}$$

$$\alpha_S(i,j) = \begin{cases} 0 & M_S(i,j) < T_{S1} \\ 1 & M_S(i,j) > T_{S2} \\ \dfrac{M_S(i,j) - T_{S1}}{T_{S2} - T_{S1}} & \text{otherwise} \end{cases} \quad (14)$$

With respect to the above variables, $T_{I1}$, $T_{I2}$, $T_{S1}$ and $T_{S2}$ are design constraints set by the system designer based on empirical study. For example, $T_{I2}$ may be set to 50, $T_{I2}$ may be set to 306, $T_{S1}$ may be set to 10 and $T_{S2}$ may be set to 18. The variable S(i,j) represents the complexity of the image at block (i,j). A relatively larger value of S(i,j) indicates a more complex image, and a relatively smaller value of S(i,j) indicates a less complex image. $M_I(i,j)$ is 4-bit quantized value and $0 \leq M_I(i,j) \leq 31$ (value greater than 31 is clipped to 31).

The final spatio-temporal interpolation pixel value $Y_{ST}(i,j)$ is soft-decided by a weighted average of $Y_S(i,j)$ and $Y_T(i,j)$, $$Y_{ST}(i,j) = Y_S(i,j) \times \alpha_S(i,j) + Y_T(i,j) \times (1 - \alpha_S(i,j)) \quad (15)$$

where $Y_S(i,j)$ is a directional interpolation pixel value derived as discussed in detail below and $Y_T(i,j)$ is a temporally-calculated pixel value $$Y_T(i,j) = \frac{1}{2} \cdot (x^{n+1}(i,j) + x^{n-1}(i,j)).$$

The motion adaptive converter 12 performs one of a spatio-temporal interpolation $Y_{ST}$ and temporal interpolation $Y_T$ based on the amount of motion in the image. If there is little or no motion, the temporal interpolation is applied. If not, spatio-temporal interpolation is applied.

Figure 4C:
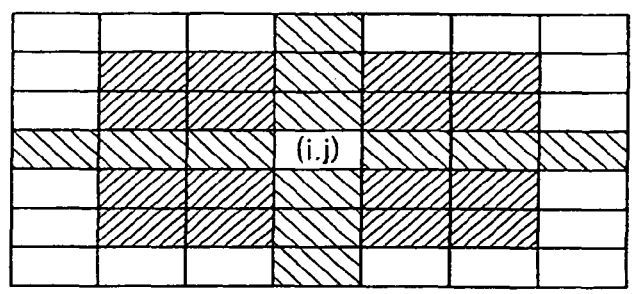
FIG. 4C illustrates an example of neighboring blocks for the block (i,j)

More specifically, if one or more than one of the neighboring motion judders $m_j(i,j)$ is "1" then spatio-temporal interpolation $Y_{ST}(i,j)$ is applied. If none of the neighboring motion judders $m_j(i,j)$ is "1", then temporal interpolation $Y_T(i,j)$ is applied. The shaded blocks in FIG. 4C surrounding the block (i,j) containing the pixel of interest represent one possible example of neighboring blocks. Hence the motion judders of these neighboring blocks are considered the neighboring motion judders.

Figure 4D:
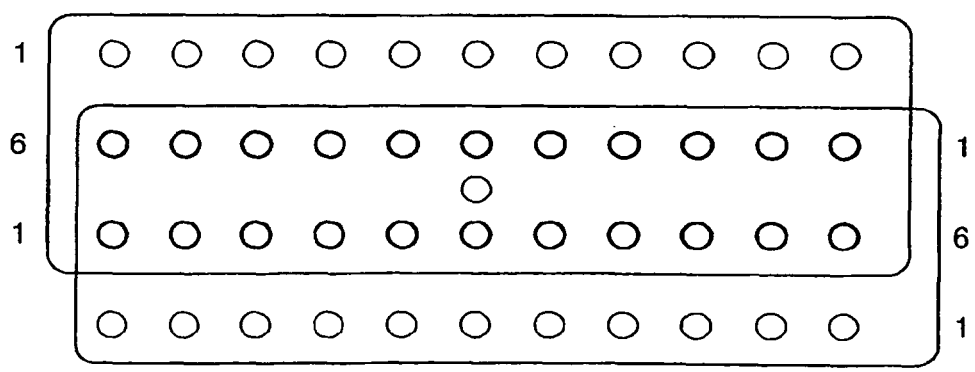
FIG. 4D illustrates vertical low-pass filtering performed to remove vertical noise.

Next, the generation of the directional interpolation pixel value will be discussed in detail. First, vertical low-pass filtering $g_n(i,j)$ is performed to remove vertical noise as shown in FIG. 4D and expression (16).

$$g_n(i,j) = \frac{x_n(i-2,j) + 6 \times x_n(i,j) + x_n(i+2,j)}{8} \quad (16)$$

Figure 4E:
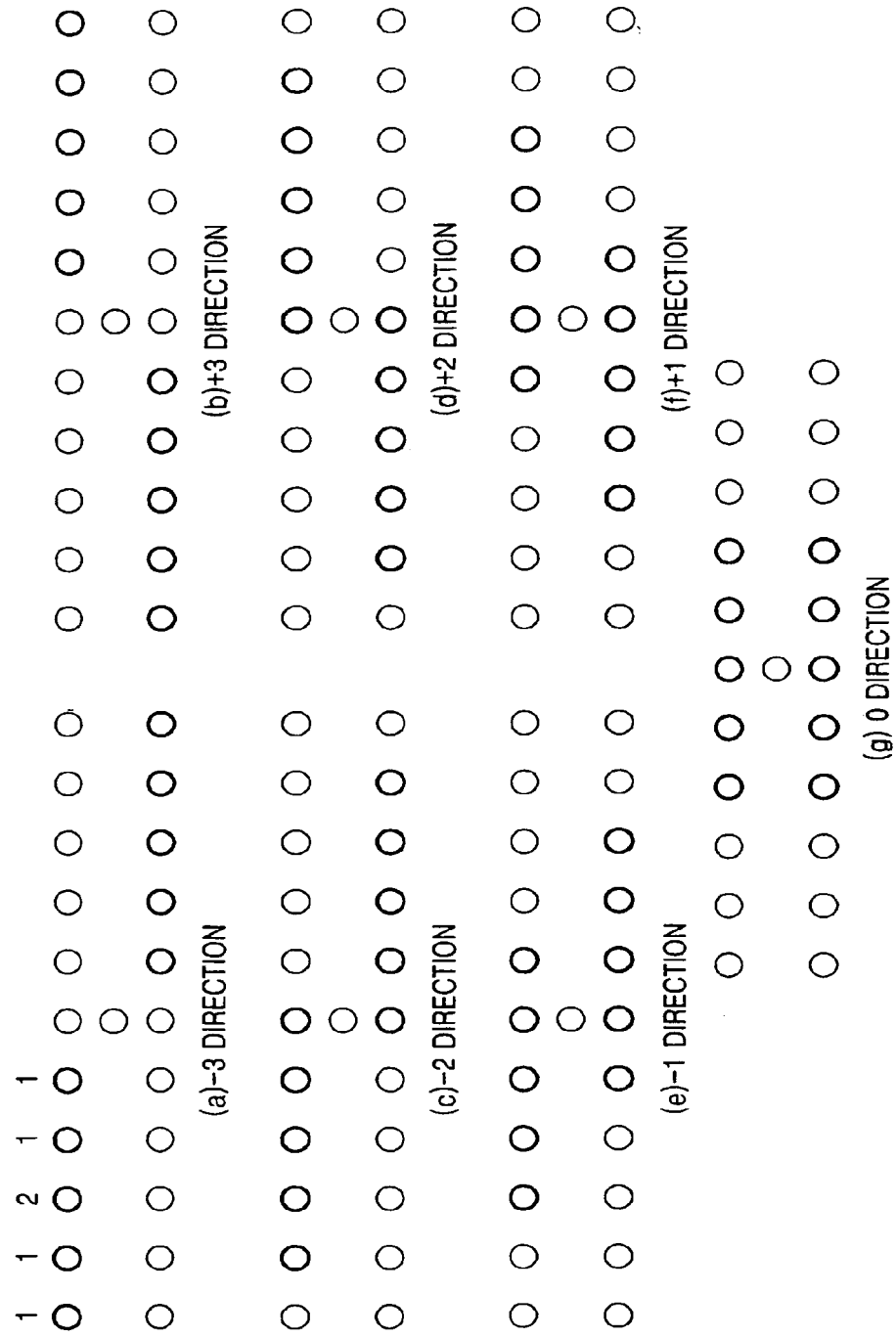
FIG. 4E illustrates the correlations of 7 directions.

The correlations of 7 directions are calculated by weighted SAD (sum of absolute difference) with weight (1, 1, 2, 1, 1) on the filtered data as illustrated in FIG. 4E, and each SAD is denoted by $WSAD_{dir}(i,j)$ with dir=0, ±1, ±2, ±3.

Then, the global and local optimal directions are given as follows.

$$DIR_{GLOBAL} = \underset{dir}{ARG}\left(\min_{-3 \leq dir \leq +3}(W_{dir} \times WSAD_{dir})\right) \quad (17)$$

$$DIR_{LOCAL} = \underset{dir}{ARG}\left(\min_{-1 \leq dir \leq +1}(W_{dir} \times WSAD_{dir})\right) \quad (18)$$

where $$W_{dir} = \begin{cases} 1.0 & dir = 0 \\ 1.25 & dir = \pm 1 \\ 1.375 & dir = \pm 2 \\ 1.5 & dir = \pm 3 \end{cases} \quad (19)$$

Reliability improvements on $DIR_{GLOBAL}$ and $DIR_{LOCAL}$ are obtained according to expressions (20) and (21) below.

If $|W_{DIR_{GLOBAL}} \cdot WSAD_{DIR_{GLOBAL}} - W_{DIR_{LOCAL}} \cdot WSAD_{DIR_{LOCAL}}| < 150$, Let
$DIR_{GLOBAL} = DIR_{LOCAL}$ \quad (20)

If $((W_{DIR=1} \cdot WSAD_{DIR=1} \leq W_{DIR=0} \cdot WSAD_{DIR=0}) \& (W_{DIR=-1} \cdot WSAD_{DIR=-1} \leq W_{DIR=0} \cdot WSAD_{DIR=0}))$, Let
$DIR_{GLOBAL} = DIR_{LOCAL} = 0$ \quad (21)

Denoting the interpolated pixel value in $DIR_{GLOBAL}$ as direction "A" and the upper/lower pixel values in $DIR_{LOCAL}$ as directions "B" and "C", respectively, the motion adaptive converter 12 determines the directionally interpolated pixel value $Y_{DIR\_OPT}$ as:

$$Y_{DIR\_OPT} = \text{median}(A, B, C) \quad (22)$$

Figure 4F:
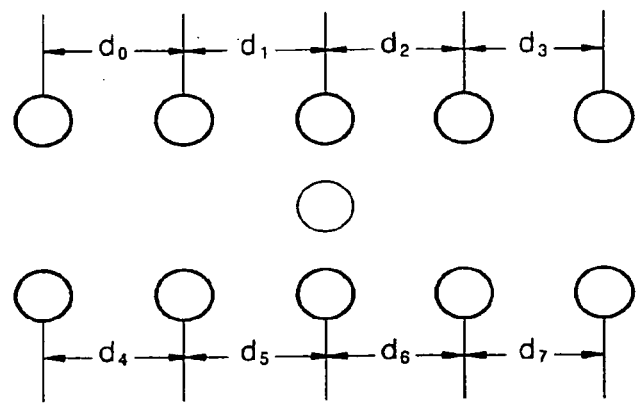
FIG. 4F provides an illustration to explain the calculation of vertical edge.

In order to preserve the vertical edge of the image, a measurement of vertical edge "D" is calculated as shown in FIG. 4F and expression (23) below.

$$D = \sum_{k=0}^{7} d_k \quad (23)$$

The edge orientation adaptive spatial interpolation pixel value $Y_S$ is obtained by the weighted average of $Y_{DIR\_OPT}$ and $Y_{DIR0}$, which means the soft-decision of the pixel value with optimal direction and the pixel value with vertical direction is then determined by the motion adaptive converter 12, according to expression (24) below.

$$Y_S = \alpha_D \times Y_{DIR0} + (1 - \alpha_D) \times Y_{DIR\_OPT} \quad (24)$$

where $$\alpha_D = \begin{cases} 0 & D < T_1 \\ 1 & D > T_2 \\ \dfrac{D - T_1}{T_2 - T_1} & \text{otherwise} \end{cases} \quad (25)$$

Here, $T_1$ and $T_2$ are design constraints set by the designer based on empirical study. For example, $T_1$ may be set as 434 and $T_2$ may be set as 466.

IPC Continued

This completes the detailed description of the motion adaptive converter 12. Returning to FIG. 3, the detailed description of the IPC 210 will now be completed. As shown, a multiplexer 14 receives the scan lines from the first memory 2, receives the output of the interpolator 10 and receives the output of the motion adaptive converter 12. A controller 16 controls the multiplexer 14 to selectively output one of the received inputs. The controller 16 also controls the operation of the motion adaptive converter 12.

The controller 16 controls the multiplexer 14 and the motion adaptive converter 12 based on received video information. The video information is header information taken from the video stream being received by the scanning conversion apparatus. As is well known, this video information will indicate whether a field of interlaced scan data IDATA is a first field in the video stream, is a top field or a bottom field, and is frame based or field based interlaced scan data. The controller 16 receives this video information for the current field X, the next field X+1 and the previous field X−1. When the currently received field is a first field of the video stream, the controller 16 turns the processing performed by the motion adaptive converter 12 off because the motion adaptive converter 12 will not have sufficient information operate.

As discussed in the background of the invention section, interlaced scan data, whether frame or field based, alternates between top and bottom fields. However, in practice, the actually received interlaced scan data may be missing a field such that two or more top or two or more bottom fields are received consecutively. When the current field is either preceded by or followed by a field of the same type (e.g., top or bottom), the controller 16 controls the multiplexer 14 to output the scanning line (i−1) from the first memory 2 as scanning line (i−1)' of the generated progressive scan data PDATA, to next output the output from the interpolator 10 as scanning line (i)' of the generated progressive scan data PDATA, and to subsequently output scanning line (i+1) from the first memory 2 as scanning line (i+1) of the generated progressive scan data PDATA. The generation of the i'th scanning line in this manner will be referred to as the bob technique. Namely, in the bob technique, a frame of progressive scan data is produced from the current field and a field of complementary scan data generated by the interpolator 10. Together the current field and the complementary field represent a frame of progressive scan data.

If the previous or next field is not missing and the video stream is frame based interlaced scan data, then the controller 16 controls the motion adaptive converter 12 to output the ith scanning line of the X−1 field received from the second memory 4 and not perform motion adaptive processing. The controller 16 also controls the multiplexer 14 to output the scanning line (i−1) from the first memory 2 as scanning line (i−1)' of the generated progressive scan data PDATA, to next output the ith scanning line from the X−1 field as scanning line (i)' of the generated progressive scan data PDATA, and to subsequently output scanning line (i+1) from the first memory 2 as scanning line (i+1) of the generated progressive scan data PDATA. The generation of the i'th scanning line in this manner will be referred to as the weave technique. In this example, it was assumed that the previous field X−1 was associated with the same point in time as the current field X−1. However, it may be the case that the next field X+1 is the field associated with the same point in time as the current field. In this situation the next field would be selected for output. Namely, in the weave technique, two consecutive fields of interlaced scan data associated with the same point in time are alternately output on a scan line by scan line basis to produce a frame of progressive scan data.

If the previous or next field is not missing and the video stream is field based interlaced scan data, then the controller 16 controls the motion adaptive converter 12 to perform the motion adaptive processing. The controller 16 also controls the multiplexer 14 to output the scanning line (i−1) from the first memory 2 as scanning line (i−1)' of the generated progressive scan data PDATA, to next output the output from the motion adaptive converter 12 as scanning line (i)' of the generated progressive scan data PDATA, and to subsequently output scanning line (i+1) from the first memory 2 as scanning line (i+1) of the generated progressive scan data PDATA. The generation of the i'th scanning line in this manner will be referred to as the motion adaptive technique. Namely, in the motion adaptive technique, a frame of progressive scan data is produced from the current field and a field of complementary scan data generated by the motion adaptive converter 12. Together the current field and the complementary field represent a frame of progressive scan data.

As will be appreciated from the disclosure, generating the progressive scan data PDATA according to the weave technique produces a full frame of data substantially without motion artifacts when the interlaced scan data IDATA is frame based. However, when the interlaced scan data IDATA is field based, the weave technique can result in an unacceptably deteriorated image when a substantial amount of image motion takes place over time. This is particularly noticeable when a still image is being displayed. By using the motion adaptive technique on field based interlaced scan data, a much improved image is obtained. Furthermore, when insufficient data is present to perform either the weave or motion adaptive techniques, a frame of progressive scan data PDATA may still be created according to the bob technique.

Figure 5:
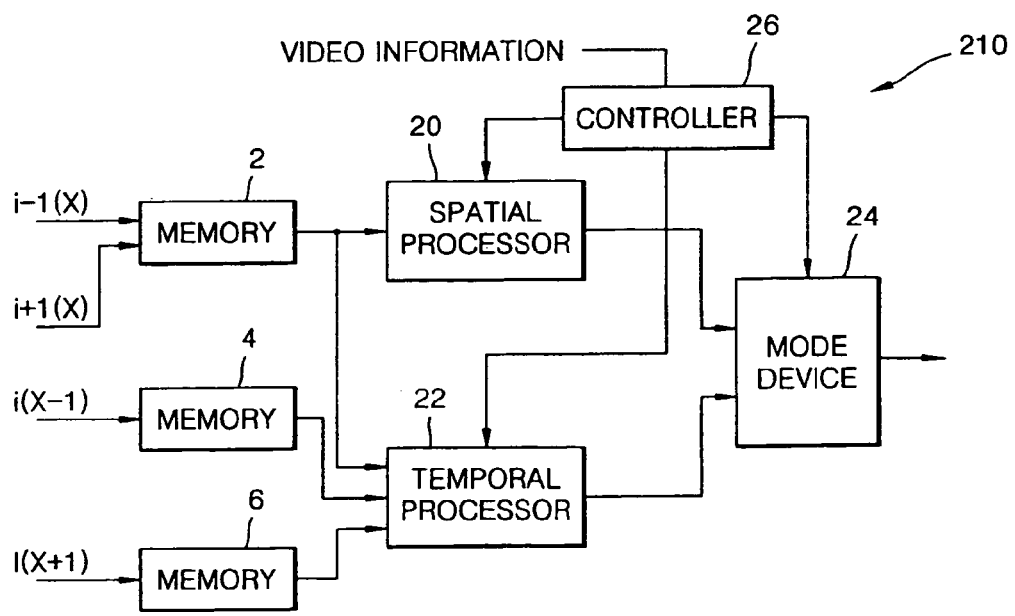
FIG. 5 illustrates another example embodiment of the IPC in FIG. 1.

FIG. 5 illustrates a second embodiment of the IPC 210 of FIG. 1. As shown, in this embodiment, the IPC 210 includes the same first, second and third memories 2, 4 and 6 storing the same scanning lines as was described above with respect to the embodiment of FIG. 3. In this embodiment, a controller 26 controls the operation of a spatial processor 20, a temporal processor 22 and a mode device 24 based on the same video information received by the controller 16 in FIG. 3.

The spatial processor 20 receives the scanning lines from the first memory 2, and under the control of the controller 26 performs spatial interpolation thereon or directly outputs the scanning lines. When performing the spatial processing, the spatial processor 20 performs either the interpolation performed by interpolator 10 or generates the spatially interpolated pixel value $Y_S$ generated as described above with respect to the motion adaptive converter 12. The spatial processing performed is controlled by the controller 26 as described in detail below.

The temporal processor 22 receives the scanning lines from the first, second and third memories 2, 4 and 6. The temporal processor 22, under the control of the controller 26, either outputs the ith scanning line of the X−1 field received from the second memory 4 or outputs the temporally interpolated pixel value $Y_T$ generated as described above with respect to the motion adaptive converter 12.

The mode device 24 uses the outputs from the spatial processor 20 and the temporal processor 22 to generate the progressive scan data PDATA according to one of the bob, weave and motion adaptive techniques. The mode device 24, along with the spatial and temporal processors 20 and 22 operate under the control of the controller 26 as discussed in detail below.

When the current field is preceded by or followed by a field of the same type, the controller 26 turns the temporal processor 22 off, and controls the mode device 24 to output the output received from the spatial interpolator 20. The controller 26 further controls the spatial processor 20 to output the scanning line (i−1) from the first memory 2 as scanning line (i−1)' of the generated progressive scan data PDATA, to next output a scanning line generated by the same spatial interpolation performed by the interpolator 10 as scanning line (i)' of the generated progressive scan data PDATA, and to subsequently output scanning line (i+1) from the first memory 2 as scanning line (i+1) of the generated progressive scan data PDATA. Accordingly, a frame of progressive scan data is generated according to the bob technique.

If the previous or next field is not missing and the video stream is frame based interlaced scan data, then the controller 26 controls the spatial processor 20 to output the scanning lines received from the first memory 2, and controls the temporal processor 22 to output the scanning line (i) received from the second memory 4. The controller 26 controls the mode device 24 to output the scanning line (i−1) of the first memory 2 as scanning line (i−1)' of the generated progressive scan data PDATA, to next output scanning line (i) from the X−1 field as scanning line (i)' of the generated progressive scan data PDATA, and to subsequently output scanning line (i+1) of the first memory 2 as scanning line (i+1) of the generated progressive scan data PDATA. Accordingly, a frame of progressive scan data is generated according to the weave technique.

If the previous or next field is not missing and the video stream is field based interlaced scan data, then the controller 26 controls the spatial processor 20 to output the scanning lines received from the first memory 2 and to generate the spatially interpolated pixel value $Y_S$. The controller 26 also controls the temporal processor 22 to generate temporally interpolated pixel value $Y_T$. The controller 26 controls the mode device 24 to combine the spatially interpolated pixel value $Y_S$ and the temporally interpolated pixel value $Y_T$ to generate the spatio-temporal interpolated pixel value $Y_{ST}$ in the same manner as described above with respect to the motion adaptive converter 12. The controller 26 further controls the mode device 24 to output the scanning line (i−1) from the first memory 2 as scanning line (i−1)' of the generated progressive scan data PDATA, to next output the spatio-temporal interpolated pixel values $Y_{ST}$ as scanning line (i)' of the generated progressive scan data PDATA, and to subsequently output scanning line (i+1) from the first memory 2 as scanning line (i+1) of the generated progressive scan data. Accordingly, a frame of progressive scan data is generated according to the motion adaptive technique.

As discussed above, the embodiment of FIG. 5 generates progressive scan data PDATA according to the bob, weave and motion adaptive techniques to obtain the same benefits as described above with respect to FIG. 3.

PIC of the Scanning Conversion Apparatus

Figure 6:
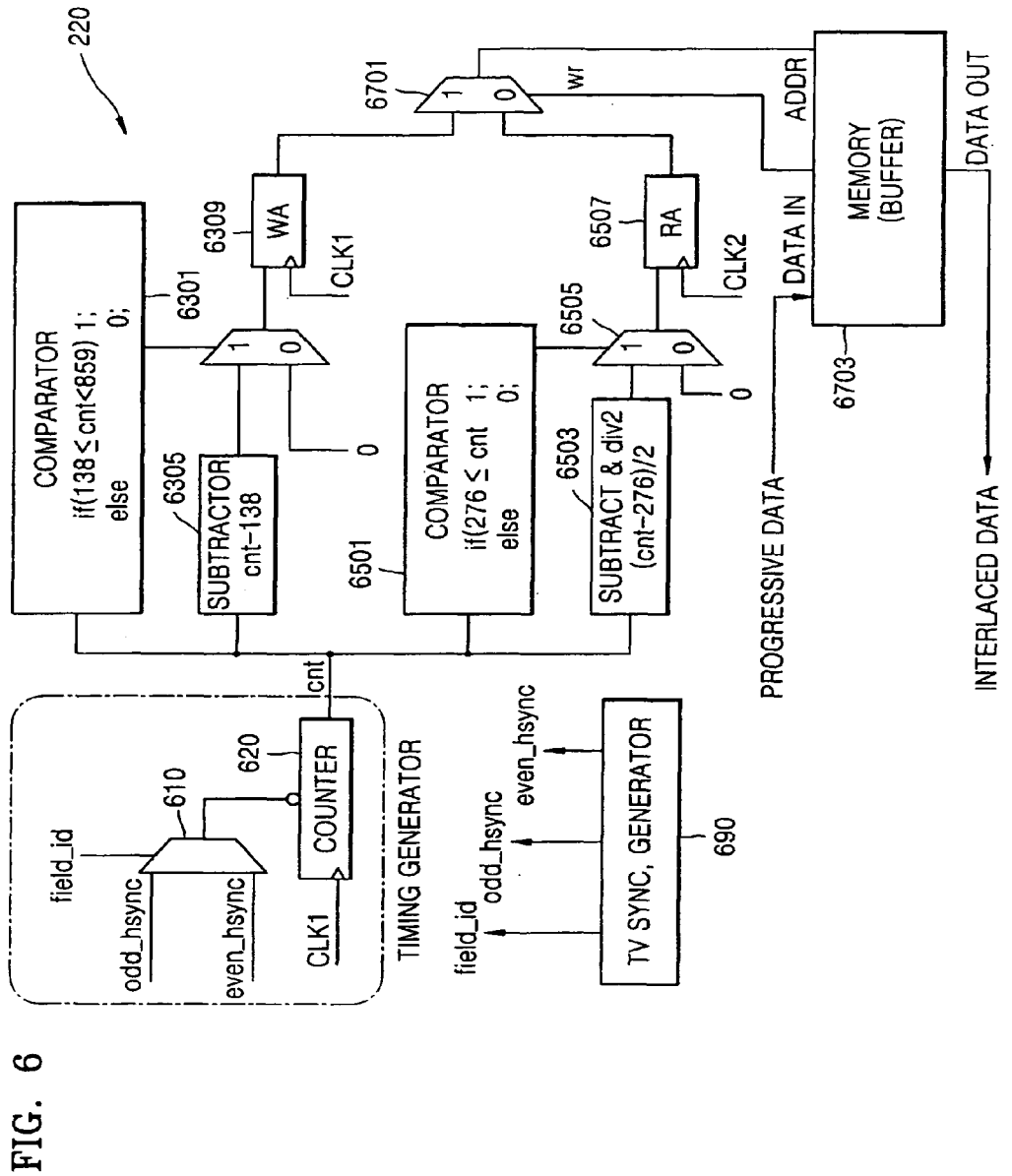
FIG. 6 illustrates an example embodiment of the progressive-to-interlaced converter (PIC) of FIG. 1.
Figure 7:
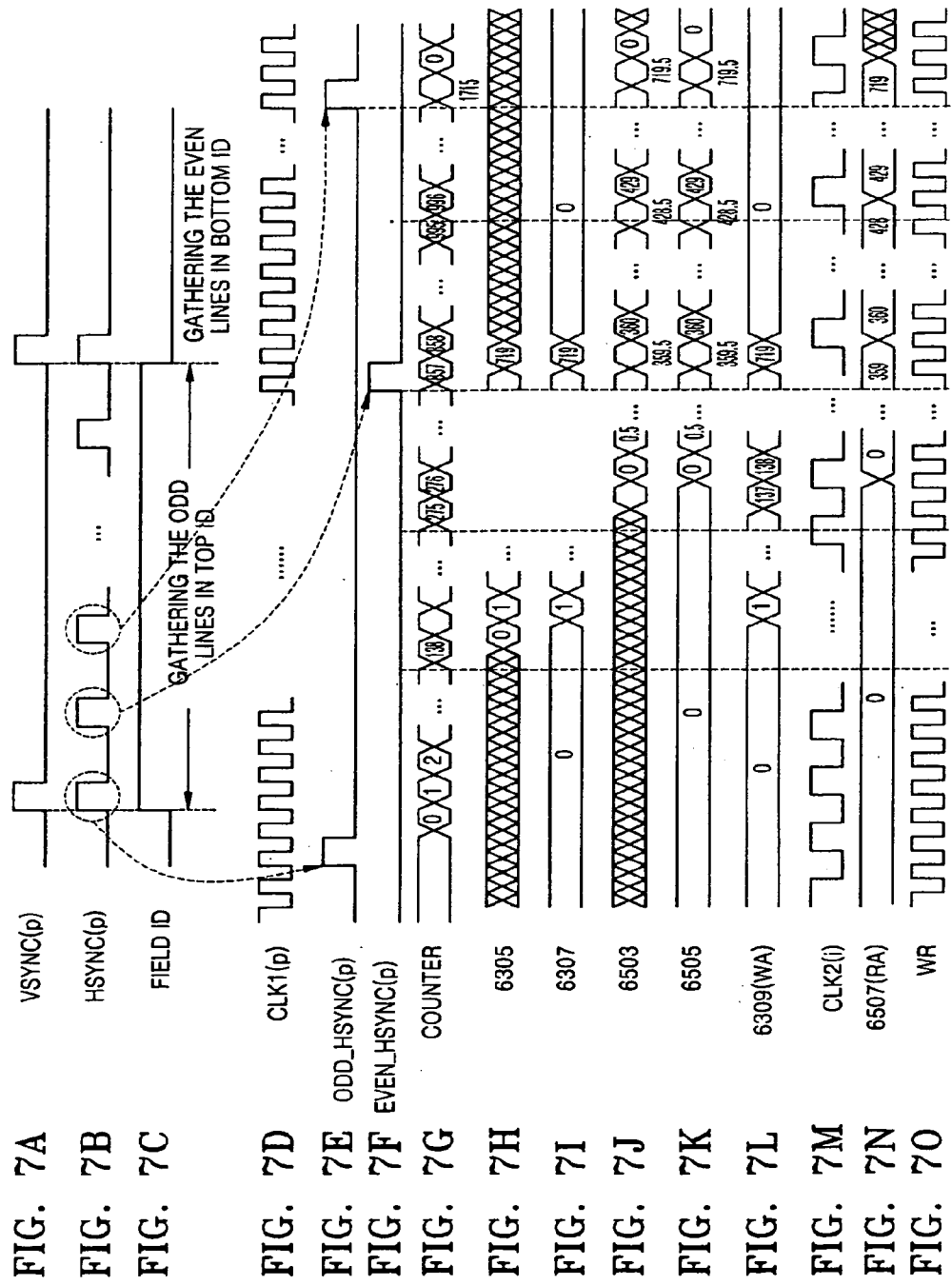
FIG. 7 illustrates waveforms input by and output by elements of the PIC in FIG. 6.

Next, an example embodiment of the PIC 220 will be described with respect to FIGS. 6 and 7. FIG. 6 illustrates an example embodiment of the PIC 220. In this embodiment, the PIC 220 includes a synchronous signal generator 690 such as for a television. As shown, the synchronous signal generator 690 generates a field identifier signal field_id, an odd horizontal sync signal odd h_sync and an even horizontal sync signal even h_sync.

The field identifier indicates whether the current interlaced scan data field to generate from the generated progressive scan data PDATA is an even field or an odd field. FIG. 7C illustrates an example of the field identifier signal. As shown, when the signal is high, an odd field is generated and when the signal is low an even field is generated. FIG. 7B illustrates the progressive horizontal synchronous signal hsync(p). Each pulse of the progressive horizontal synchronous signal hsync(p) represents one scanning line of pixel data. FIG. 7A illustrates the progressive vertical synchronous signal vsync(p). Each pulse represents the beginning of a new frame of progressive scan pixel data. Accordingly, the number of progressive horizontal synchronous signal hsync(p) pulses between consecutive progressive vertical synchronous signal vsync(p) represents the number of scanning lines in a frame of the progressive scan data.

FIG. 7E illustrates an example of the odd horizontal sync signal odd_hsync and FIG. 7F illustrates an example of the even horizontal sync signal even_hsync derived from the progressive horizontal synchronous signal hsync(p). As shown, the odd and even horizontal sync signals have a frequency that is half the frequency of the progressive horizontal synchronous signal hsync(p). Furthermore, the odd and even horizontal sync signals are shifted by one period of the progressive horizontal sync signal hsync(p) from one another. As shown, the odd horizontal sync signal includes a pulse at the beginning of the odd field generation period, and the even horizontal sync signal includes a pulse at the beginning of the even field generation period.

Before discussing the remainder of the PIC structure, horizontal and vertical blanking intervals for interlaced and progressive scan data will be discussed. The scan of one horizontal line of interlaced data occurs at a frequency of 13.5 Mhz. During the scanning one line of interlaced scan data at this frequency 858 clock pulses of a video data clock are generated. The first 138 clock pulses represent the horizontal blanking interval. This is the time it takes the scanner to move from the end of one scan line to the beginning of the next scan line. The next 720 clock pulses represent the pixels being scanned across the scan line. The progressive horizontal scanning frequency is twice that of the interlaced horizontal scanning frequency, 27 Mhz. Accordingly, in the same time, 2×858 progressive scan video clock pulses are generated. This equates to the scanning of two lines during the same time that one line is scanned in interlaced horizontal line scanning.

Returning to FIG. 6, a reset multiplexer 610 selectively outputs one of the odd horizontal sync signal and the even horizontal sync signal as a reset signal based on the field identifier field_id. A counter 620 counts the pulses of a first clock signal generating clock pulses at the video data rate (e.g., 858 pulses per scan line) of the progressive scan data until reset by the reset signal. As will be appreciated, the count values are associated with a period of the progressive scan data.

The remainder of the description of the embodiments of the present invention are described for a video data rate of 858 clock pulses per scan line. However, one skilled in the art would understand that the present invention is applicable to other rates. FIG. 7D illustrates an example of the first clock signal. As will be appreciated from FIG. 7D and the above description, during the odd field generation period indicated by the field identifier field_id, the counter 620 is only reset by the pulses of the odd horizontal sync signal odd_hsync. Similarly, during the even field generation period indicated by the field identifier field_id, the counter 620 is reset only by the pulses of the even horizontal sync signal even_hsync. FIG. 7G illustrates the pulse count output by the counter 620 for a scan line during generation of an odd field. As will be appreciated from FIG. 7G and the above description, the counter 620 generates count values at a progressive scanning frequency such that the count values are associated with a period of the progressive scan data. Namely, the counter 620 generates count values associated with different periods of the progressive scan data based on whether the progressive scan data is being converted into one of an odd and an even field of interlaced scan data. For example, the counter 620 generates count values associated with a odd scan line and a subsequent even scan line of progressive data when the progressive scan data is being converted into an odd field of interlaced scan data, and the counter 620 generates count values associated with an even scan line and a subsequent odd scan line of progressive scan data when the progressive scan data is being converted into an even field of interlaced scan data. In this manner, the counter 620 serves as a timer indicating a timing of two consecutive scan lines of the progressive scan data.

The pulse count generated by the counter 620 is received by a subtractor 6305, which generates a pixel count. The pixel count equals the pulse count minus 138 (i.e., the horizontal blanking interval). Accordingly, the pixel count represents when a scanning line is scanning the pixels of a display in progressive scanning. FIG. 7H illustrates the pixel count output by the subtractor 6305. A second multiplexer 6307 selectively outputs the pixel count and a zero value based on a control signal received from a first comparator 6301.

The first comparator 6301 determines if the pulse count is greater than or equal to 138 and less than 859. Namely, the comparator 6301 determines if the pulse count represents when a scanning line is to be scanned. If so, the first comparator 6301 generates a control signal (e.g., a '1') such that the second multiplexer 6307 outputs the pixel count. If the pulse count is not greater than or equal to 138 nor less than 859, then the first comparator 6301 generates a control signal (e.g., '0') such that the second multiplexer 6307 output the zero value. FIG. 7I illustrates the output of the second multiplexer 6307.

A first latch 6309 generates an write address (WA) based on the received output from the second multiplexer 6307. Specifically, the first latch 6309 stores the output of the second multiplexer 6307 in accordance with the first clock signal. FIG. 7L illustrates the write addresses generated by the first latch 6309. As will be appreciated, when a scanning line of an odd field is being generated, write addresses are generated for the first of two consecutive scanning lines. Because the zero value is selected once the pulse count exceeds 858, the write addresses become zero for the next scanning line, at the end of which the pulse counter 620 is reset. The same operation takes place when generating scanning lines for an even field; however, because the pulse counter 620 is reset by the even horizontal sync signal even_hsync instead of the odd horizontal synch signal odd_sync, the scanning line for which write addresses are generated is shifted one scan line with respect to the scanning line for which write addresses are generated when generating write addresses for an odd field.

The pulse count output from the first counter 620 is also received by an arithmetic unit 6503. The arithmetic unit 6503 subtracts 276 from the pulse count and divides the result by two to generate an interlaced pixel count. The value 276 represents two horizontal blanking intervals (2*138=276) such that dividing the subtraction result produces a value representing a pixel count when scanning a line of interlaced data. FIG. 7J illustrates the interlaced pixel count.

A third multiplexer 6505 selectively outputs the interlaced pixel count and a zero value based on a control signal received from a second comparator 6501. The second comparator 6501 determines if the pulse count is greater than or equal to 276. If so, the second comparator 6501 generates a control signal (e.g., a '1') such that third multiplexer 6505 outputs the interlaced pixel count. If the pulse count is not greater than or equal to 276, then the second comparator 6501 generates a control signal (e.g., '0') such that the third multiplexer 6501 outputs the zero value. FIG. 7K illustrates the output of the third multiplexer 6505.

A second latch 6507 generates read addresses (RAs) based on the received output from the third multiplexer 6505. Specifically, the second latch 6507 stores the output of the third multiplexer 6507 in accordance with a second clock signal. The second clock signal has clock pulses at the video data rate of interlaced scan data. FIG. 7M illustrates the second clock signal. As shown, the frequency of the second clock signal is half that of the first clock signal illustrated in FIG. 7D. FIG. 7N illustrates the read addresses generated by the second latch 6507. As shown by FIG. 7N, even though the third multiplexer 6507 may generate a stream of numbers such as 358, 358.5, 359, 359.5, 360, etc., the second latch 6507 truncates the decimal portion of the interlaced pixel count. As a result, the second latch 6507 generates the same read address for two consecutive counts of the progressive pixel count and one count of the interlaced pixel count. Namely, the second latch 6507 generates read addresses at the interlaced video data rate.

A fourth multiplexer 6701 selectively outputs one of the write address received from the first latch 6309 and the read address received from the second latch 6507 based on a write signal WR received from a memory 6703. FIG. 7O illustrates the write signal. As shown, the write signal is a clock signal having the same frequency as the first clock signal. When the write signal is high, the fourth multiplexer 6701 outputs the write address, and the memory 6703 stores a pixel of the progressive scan data. When the write address is low, the fourth multiplexer 6701 outputs the read address, which will be the same for two consecutive pulses of the write signal WR, and the memory 6701 outputs pixel data stored at the read address as the interlaced scan data IDATA'.

While the discussion above focused on the generation of a scan line for an odd field of interlaced scan data, the generation of a scan line for an even field of interlaced scan data will be readily appreciated from the above description.

As shown above, the writing of progressive scan data into the memory 6703 and the reading of interlaced scan data out of the memory 6703 are both based on the same signal, write signal WR. Furthermore, the generation of the write and read addresses is based on the first and second clocks which have a fixed relationship. As a result of the above, the generated interlaced scan data IDATA' is synchronized with the generated progressive scan data PDATA.

Figure 8:
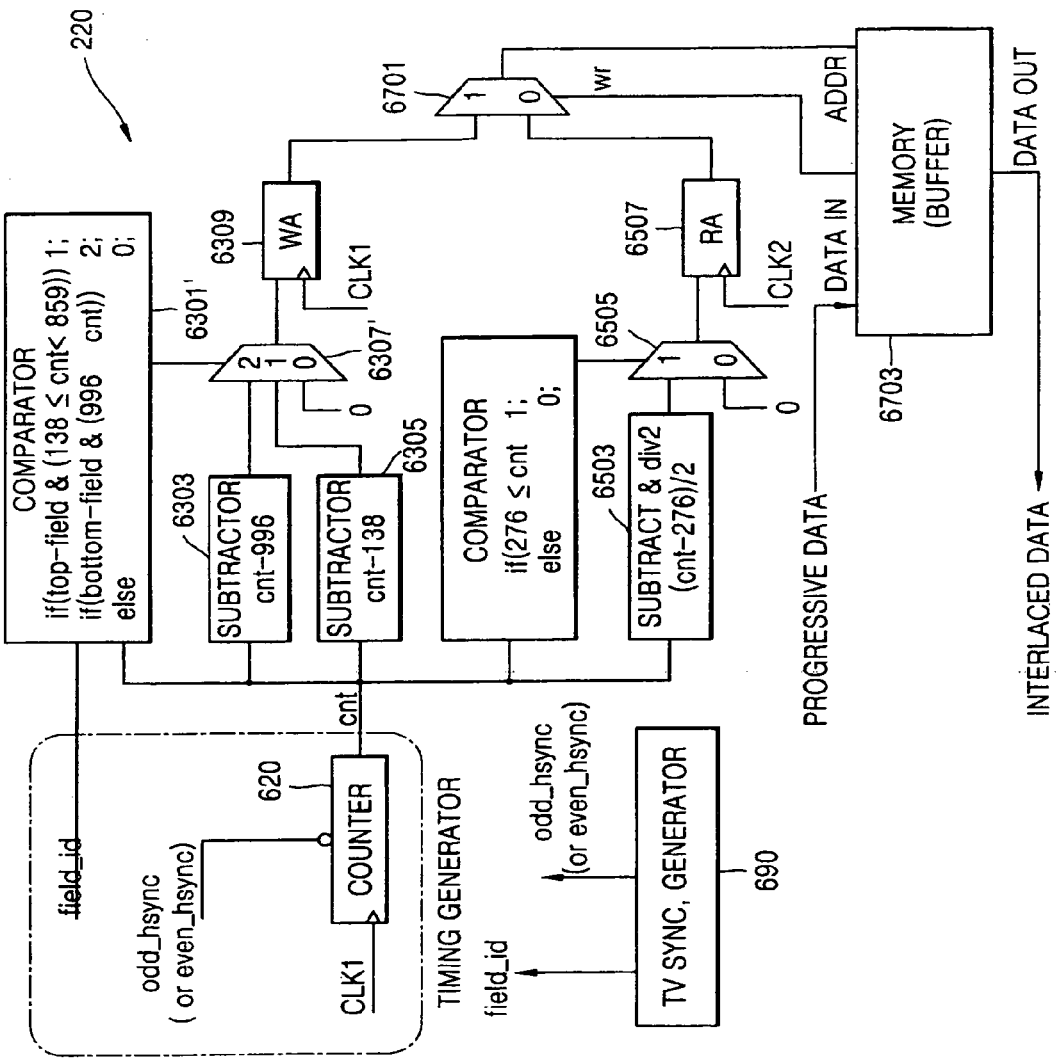
FIG. 8 illustrates another example embodiment of the progressive-to-interlaced converter (PIC) of FIG. 1.

Another example embodiment of the PIC 220 will be described with respect to FIGS. 8 and 9. FIG. 8 illustrates an example embodiment of the PIC 220. The embodiment of FIG. 8 is the same as the embodiment of FIG. 6, except for the differences discussed in detail below. Because, for the most part, the embodiment of FIG. 8 is the same as the embodiment of FIG. 6, only the difference will be discussed for the sake of brevity.

In the embodiment of FIG. 8, the first counter 620 is reset based on only one of the odd horizontal synchronous signal odd_hsync or the even horizontal synchronous signal even_hsync. As a result, the timing for resetting the pulse counter 620 depending on whether an even field or odd field is being generated does not take place. Instead, this embodiment, provides a third subtractor 6303, a different first comparator 6301' and a different second multiplexer 6307' to effect this timing change.

As shown, the third subtractor 6303 generates an even field scan line pixel count by subtracting the value 996 from the pulse count. The value 996 equals 858 (the first scan line)+138 (the horizontal blanking interval of the next scan line. As such, it will be appreciated that the first subtractor 6305 generates the odd field scan line pixel count.

The first comparator 6301' determines whether an odd or top field is being generated and whether the pulse count represents the pixel data for an odd scan line, and determines whether an even or bottom field is being generated and whether the pulse count represents the pixel data for an even scan line. Specifically, the first comparator 6301' generates a control signal of "1" when the field identifier field_id indicates a top or odd field and the pulse count is greater than or equal to 138 and less than 859. The first comparator 6301' generates a control signal of "2" when the field identifier field_id indicates en even or bottom field and the pulse count is greater than or equal to 996. When the pulse count is less than 138, the first comparator 6301' generates a control signal of "0".

The first multiplexer 6307' outputs the even scan line pixel count when the first comparator 6301' generates a control signal of "2", outputs the odd scan line pixel count when the first comparator 6301' generates a control signal of "1", and outputs the zero value when the first comparator 6301' generates a control signal of '0'.

FIGS. 9A-9O illustrates the same waveforms as represented by FIGS. 7A-7O, respectively. FIG. 8P illustrates the even field pixel count produced by the third subtractor 6303.

As will be appreciated, this embodiment of the present invention provides the same synchronization between the generated progressive scan data PDATA and the generated interlaced scan data IDATA' as discussed in detail above with respect to the embodiment of FIG. 6.

The invention being thus described, it will be obvious that the same may be varied in many ways. Such variations are not to be regarded as a departure from the spirit and scope of the invention, and all such modifications are intended to be included within the scope of the invention.

The invention claimed is:

1. An interlaced-to-progressive conversion method, comprising:
   selectively performing, by an interlaced-to-progressive (IPC) converter, one of at least two interlaced-to-progressive conversion (IPC) techniques on input interlaced scan data based on a received control command; wherein
      the received control command indicates to perform a spatial interpolation IPC technique when a current field of the input interlaced scan data is one of preceded and followed by a field of a same type, and
      the received control command indicates to perform a spatial/temporal interpolation IPC technique when the input interlaced scan data is field based interlaced scan data.

2. An interlaced-to-progressive conversion method, comprising:
   receiving, at an interlaced-to-progressive (IPC) converter, a control command to perform one of at least two interlaced-to-progressive conversion (IPC) techniques on input interlaced scan data; and
   performing, by the interlaced-to-progressive (IPC) converter, the IPC technique instructed by the received control command on the input interlaced scan data; wherein
      the control command indicates to perform a spatial interpolation IPC technique when a current field of the input interlaced scan data is one of preceded and followed by a field of a same type; and
      the control command indicates to perform a spatial/temporal interpolation IPC technique when the input interlaced scan data is field based interlaced scan data.

3. The method of claim 2, wherein
   the spatial interpolation IPC technique performs spatial interpolation on the current field of the input interlaced scan data to produce a field of complementary scan data that together with the current field represents a frame of progressive scan data; and
   the spatial/temporal interpolation IPC technique performs directionally adaptive spatial interpolation selectively combined with temporal interpolation using the current field, at least one previous field and at least one subsequent field of the input interlaced scan data to produce the field of complementary scan data that together with the current field represents the frame of progressive scan data.

4. The method of claim 2, wherein the spatial/temporal interpolation IPC technique is adaptive.

5. The method of claim 2, further comprising:
   generating the control command to indicate the spatial interpolation technique when the current field of the input interlaced scan data is one of preceded and followed by the field of the same type; and
   generating the control command to indicate the spatial/temporal interpolation IPC conversion technique when the input interlaced scan data is field based interlaced scan data.

6. An interlaced-to-progressive conversion method, comprising:
   selectively performing, by an interlaced-to-progressive (IPC) converter, one of a plurality of interlaced-to-progressive conversion (IPC) techniques on input interlaced scan data according to a received control command; wherein
      the received control command indicates to perform a spatial interpolation technique when a current field of the input interlaced scan data is one of preceded and followed by a field of a same type,
      the received control command indicates to perform an alternate field output technique, in which two consecutive fields of the input interlaced scan data are alternately output on a scan line by scan line basis to produce a frame of progressive scan data, when the input interlaced scan data is frame based interlaced scan data, and
      the received control command indicates to perform a spatial/temporal interpolation IPC technique when the input interlaced scan data is field based interlaced scan data.

7. An interlaced-to-progressive conversion method, comprising:
   receiving, at an interlaced-to-progressive (IPC) converter, a control command to perform one of at least two interlaced-to-progressive conversion (IPC) techniques on input interlaced scan data; and
   performing, by the interlaced-to-progressive (IPC) converter, the IPC technique instructed by the received control command on the input interlaced scan data; wherein
      the control command indicates to perform a spatial interpolation technique when a current field of the input interlaced scan data is one of preceded and followed by a field of a same type.
      the control command indicates to perform an alternate field output technique, in which two consecutive fields of the input interlaced scan data are alternately output on a scan line by scan line basis to produce a frame of progressive scan data, when the input interlaced scan data is frame based interlaced scan data, and
      the control command indicates to perform a spatial/temporal interpolation IPC technique when the input interlaced scan data is field based interlaced scan data.

8. The method of claim 7, further comprising:
   generating the control command to indicate the spatial interpolation technique when the current field of the input interlaced scan data is one of preceded and followed by the field of the same type;

generating the control command to indicate the alternate field output technique when the input interlaced scan data is frame based interlaced scan data; and generating the control command to indicate the spatial/temporal interpolation IPC conversion technique when the input interlaced scan data is field based interlaced scan data.

9. An interlaced-to-progressive (IPC) converter, comprising:
a conversion structure configured to generate different streams of scan data from input interlaced scan data, the different streams of scan data representing conversion of the input interlaced scan data into portions of progressive scan data according to different IPC conversion techniques; and
a selector configured to selectively output the different streams of scan data as progressive scan data; wherein
the conversion structure includes,
an interpolator configured to perform spatial interpolation on a current field of the input interlaced scan data to produce a field of complementary scan data that together with a current field represents a frame of progressive scan data, and
a spatial/temporal interpolator is configured to perform directionally adaptive spatial interpolation selectively combined with temporal interpolation using the current field, at least one previous field and at least one subsequent field of the input interlaced scan data to produce a field of complementary scan data that together with the current field represents the frame of progressive scan data, and wherein the selector is configured to,
select an output from the interpolator as a portion of the progressive scan data when the current field of the input interlaced scan data is one of preceded and followed by a field of a same type,
select data from the current field of the input interlaced scan data and data from one of a previous or next field of the input interlaced scan data as the progressive scan data when the input interlaced scan data is frame based interlaced scan data, and
select output from the spatial/temporal interpolator as a portion of the progressive scan data when the input interlaced scan data is field based interlaced scan data.

10. The converter of claim 9, wherein the conversion structure is configured to supply the selector with the input interlaced scan data of the current field and one of a preceding and following field of the input interlaced scan data.

11. The converter of claim 9, wherein the spatial/temporal interpolator is configured to directionally adapt the spatial interpolation based on a measure of a difference between pixels neighboring a pixel being interpolated.

12. The converter of claim 9, further comprising:
a controller controlling the selector to select a scan data stream generated according to the spatial interpolation IPC technique when the current field of the input interlaced scan data is one of preceded and followed by the field of the same type; to alternate outputting the current field and one of a previous and next field when the input interlaced scan data is frame based interlaced scan data; and to select the output from the spatial/temporal interpolator when the input interlaced scan data is field based interlaced scan data.

13. An interlaced-to-progressive converter comprising:
a conversion structure configured to perform an interlaced-to-progressive conversion (IPC) technique instructed by a received control command on input interlaced scan data; wherein
the control command indicates to perform a spatial interpolation IPC technique when a current field of the input interlaced scan data is one of preceded and followed by a field of a same type; and
the control command indicates to perform a spatial/temporal interpolation IPC technique when the input interlaced scan data is field based interlaced scan data.

14. The converter of claim 13, wherein
the spatial interpolation IPC technique performs spatial interpolation on the current field of the input interlaced scan data to produce a field of complementary scan data that together with the current field represents a frame of progressive scan data; and
the spatial/temporal interpolation IPC technique performs directionally adaptive spatial interpolation selectively combined with temporal interpolation using the current field and at least one previous field and at least one subsequent field of the input interlaced scan data to produce the field of complementary scan data that together with the current field represents a frame of progressive scan data.

15. The converter of claim 13, wherein the spatial/temporal interpolation IPC conversion technique is adaptive.

16. The converter of claim 13, wherein the conversion structure comprises:
an interpolator configured to interpolate lines of a frame of progressive scan data missing from the current field of the input interlaced scan data by spatially interpolating the missing lines using the current field.

17. The converter of claim 13, wherein the conversion structure comprises:
a spatial/temporal interpolator configured to perform the spatial/temporal interpolation IPC conversion technique on the input interlaced scan data to produce a portion of the progressive scan data.

18. The converter of claim 17, wherein the spatial/temporal interpolator is configured to perform adaptive spatial/temporal interpolation.

19. The converter of claim 17, wherein the spatial/temporal interpolator is configured to perform directionally adaptive spatial interpolation.

20. The converter of claim 17, wherein the spatial/temporal interpolator is configured to adapt the spatial/temporal interpolation based on a complexity of an image.

21. The converter of claim 17, wherein the spatial/temporal interpolator is configured to adapt the spatial/temporal interpolation to reduce an influence of the temporal interpolation as a change in an image over time increases.

22. The converter of claim 13, wherein the conversion structure includes,
an interpolator configured to perform spatial interpolation on the current field of the input interlaced scan data to produce a field of complementary scan data that together with the current field represents a frame of progressive scan data; and
a spatial/temporal interpolator configured to perform directionally adaptive spatial interpolation selectively combined with temporal interpolation using the current field, at least one previous field and at least one subsequent field of the input interlaced scan data to produce a field of complementary scan data that together with the current field represents a frame of progressive scan data, the converter further including, a selector configured to receive an output of the interpolator, and output of the spatial/temporal interpolator.

23. The converter of claim 22, wherein the selector is configured to select the output from the interpolator as a portion of the progressive scan data when the current field of the input interlaced scan data is one of preceded and followed by the field of the same type;

the selector is configured to select data from the current field of the input interlaced scan data and data from one of a previous and next field of the input interlaced scan data as the progressive scan data when the input interlaced scan data is frame based interlaced scan data; and the selector is configured to select the output from the spatial/temporal interpolator as a portion of the progressive scan data when the input interlaced scan data is field based interlaced scan data.

24. An interlaced-to-progressive converter comprising:

a conversion structure configured to perform an interlaced-to-progressive conversion (IPC) technique instructed by a received control command on input interlaced scan data; wherein the control command indicates to perform a spatial interpolation technique when a current field of the input interlaced scan data is one of preceded and followed by a field of a same type, the control command indicates to perform an alternate field output technique, in which two consecutive fields of the input interlaced scan data are alternately output on a scan line by scan line basis to produce a frame of progressive scan data, when the input interlaced scan data is frame based interlaced scan data, and the control command indicates to perform a spatial/temporal interpolation IPC technique when the input interlaced scan data is field based interlaced scan data.

* * * * *